UNITED STATES PATENT OFFICE.

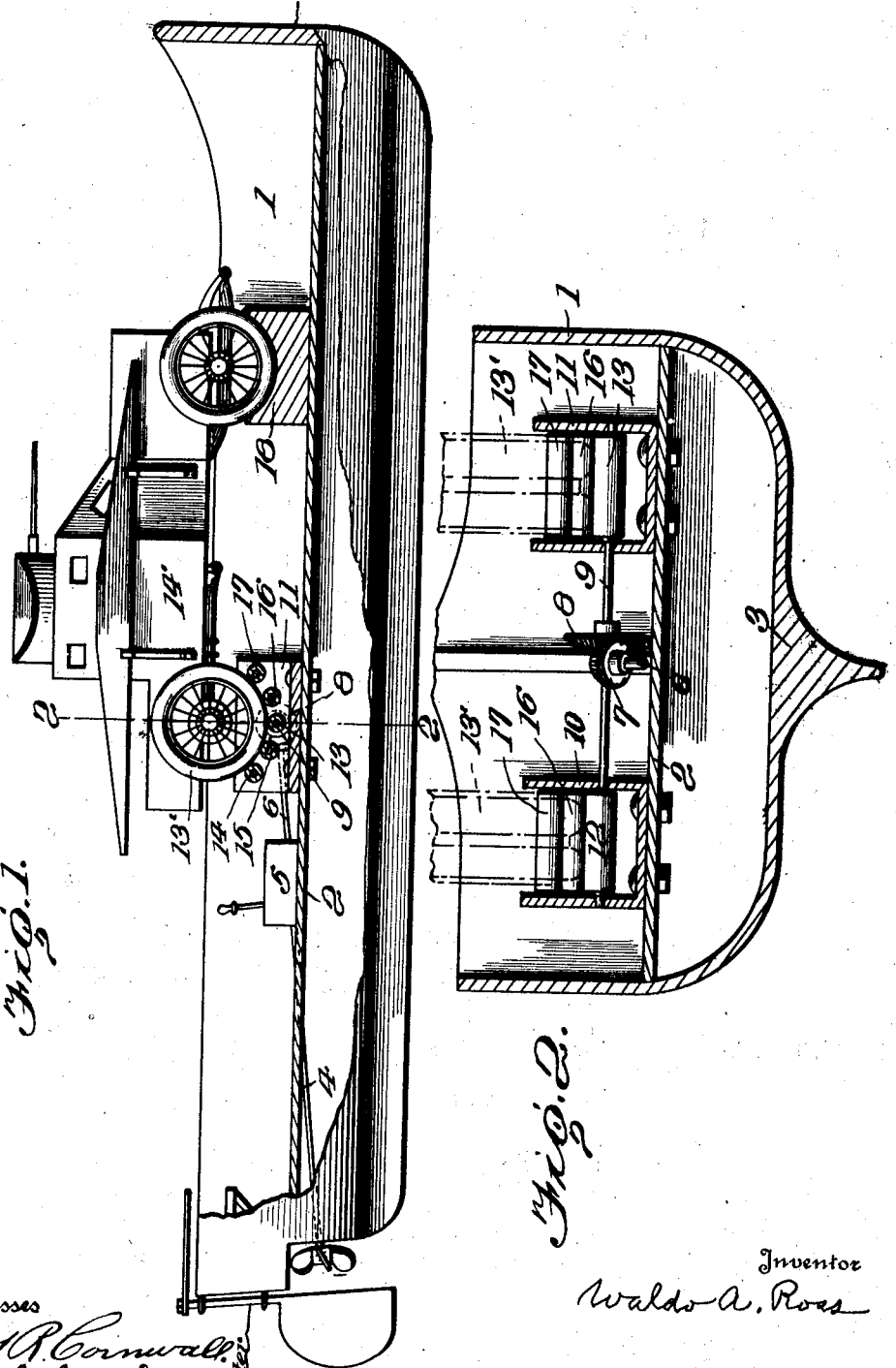

WALDO A. ROSS, OF WASHINGTON, DISTRICT OF COLUMBIA, ASSIGNOR TO THE ARMORED MOTOR CAR COMPANY, INCORPORATED, OF DETROIT, MICHIGAN, A CORPORATION OF MICHIGAN.

LANDING-TRANSPORT.

1,333,447.  Specification of Letters Patent.  Patented Mar. 9, 1920.

Application filed October 23, 1916. Serial No. 127,196.

*To all whom it may concern:*

Be it known that I, WALDO A. ROSS, a citizen of the United States, residing at Washington, in the District of Columbia, have invented certain new and useful Improvements in Landing - Transports, of which the following is a description, reference being had to the accompanying drawing and to the figures of reference marked thereon.

My invention relates to improvements especially designed for use of the Army and Navy as an equipment for transporting troops from vessels to the shore and at the same time to provide a motor vehicle of the armored type construction which may be used while on the landing boat as a means of offense, can through its own driving mechanism by suitable connections transmit power to the propeller of the boat, and when the shore is reached can be landed and used in the ordinary way as an armored motor car.

The invention contemplates the provision of a suitable boat having the usual propeller and gearing which may or may not be operated by its own gasolene engine, and in connection therewith I provide an armored motor vehicle for the purposes above referred to which may be so supported on the boat as that the driving mechanism of the automobile may operate the propeller and which is so arranged that when landed from the boat it may be used for scouting purposes or for the ordinary warlike purposes of such a vehicle.

The invention, therefore, consists in the matters herein described and referred to in the appended claims.

In the accompanying drawings:—

Figure 1 is a longitudinal sectional view of a boat provided with suitable propelling means and showing an armored motor vehicle in operative position thereon;

Fig. 2 is a vertical transverse sectional view taken on the line 2—2 of Fig. 1, showing the vehicle wheels in dotted lines.

Referring more in detail to the drawings, 1 represents the boat which is of the ordinary form used on war vessels and is provided with the flooring 2 arranged above the bottom 3 of the boat. The propeller shaft 4 extends diagonally upwardly through the bottom of the boat and through the floor and is connected to the reversing mechanism within the housing 5. A second shaft 6 extends forwardly from the reversing mechanism and carries a bevel gear 7 meshing with a bevel gear 8 carried by the shaft 9 which extends transversely of the boat. Secured to the bottom of the boat on each side of the shaft 5 is a U-shaped housing (10 and 11) in which is journaled the shaft 9. The shaft 9 extends entirely through the U-shaped housing and is provided with the rollers 12 and 13 upon which the rear wheels 13' of the motor vehicle 14' rest and whereby the shaft 9 is driven.

Journaled in the housings 10 and 11 on each side of the rollers 12 and 13 are idle rollers 14, 15, 16 and 17 arranged in an arc of a circle to correspond with the periphery of the tire of the vehicle and upon which the wheels roll and which prevent the forward or rearward movement of the vehicle. The rollers, as shown, are below the upper edge of the housing so that the latter forms a guide for the wheels to prevent the sidewise movement thereof. The flooring of the boat forward of the housing is provided with blocks 18 having convexed upper faces in which rest the forward wheels 19 of the motor car and whereby the vehicle is supported in a level position.

In operation, the vehicle is placed in the position shown in Fig. 1 of the drawings, and the motor started. The friction of the rear wheels 13' drives the rollers 12 and 13 and the same being carried by the shaft 9 the said shaft is rotated. The rotation of the shaft causes the bevel gear 8 to rotate and said gear meshing with the bevel gear 7 causes the shaft 5 to rotate and through the reversing gear the propeller shaft 4 is rotated. The sides of the housing prevent a sidewise movement of the wheels of the vehicle, and the idle rollers 14, 15, 16 and 17 in front and rear of the wheels prevent the rearward or forward movement of the vehicle.

While I have shown a reversing mechanism in the housing 5, it will be understood that the same can be dispensed with and the propeller shaft controlled directly by the motor vehicle by the gear shift lever, as will be readily understood.

Having thus described the invention, what is claimed as new is:—

1. The combination with a boat having a propeller and its shaft, guideways arranged apart to receive the rear wheels of a motor vehicle, a shaft extending across the space between the guideways and through the guideways below their upper ends, rollers mounted on the shaft within the guideways, idle rollers mounted in the guideways on each side of the first mentioned rollers and arranged in the arc of a circle and upon which the wheels of the motor vehicle are supported, and means carried by the shaft for rotating the propeller shaft.

2. The combination with a boat having a propeller and its shaft, two guideways spaced apart to receive the rear wheels of a motor vehicle, members having curved upper faces to receive the forward wheels of the motor vehicle, a shaft extending across the space between the guideways and through the same, rollers mounted on the shaft within the guideways, a bevel gear carried by the shaft, and a bevel gear carried by the propeller shaft and meshing with the first-mentioned beveled gear.

3. The combination with a boat having a propeller and its shaft, two U-shaped guideways spaced apart to receive the rear wheels of the motor vehicle, a shaft extending across the space between the guideways and extending through the same adjacent their lower ends, rollers carried by the shaft within the guideway, idle rollers mounted in the guideways on each side of the first-mentioned drive rollers and arranged in the arc of a circle, a bevel gear carried by the shaft, and a bevel gear carried by the propeller shaft and meshing with the first-mentioned gear whereby the propeller shaft is rotated.

In testimony whereof, I affix my signature, in the presence of two witnesses.

W. A. ROSS.

Witnesses:
A. M. PARKINS,
GRACE P. BRERETON.